United States Patent [19]  [11] 4,294,401
Diermayer et al.  [45] Oct. 13, 1981

[54] DRAFT CONTROL ARRANGEMENT

[76] Inventors: Werner Diermayer, 1275 Panorama Dr., Lafayette, Calif. 94549; Luitpold Kutzner, Marschnerstrasse 78, D-8000 Munich; Erwin Postenreider, Postfach 240, D-8031 Groebenzell, both of Fed. Rep. of Germany

[21] Appl. No.: 28,718

[22] Filed: Apr. 9, 1979

Related U.S. Application Data

[63] Continuation of Ser. No. 831,547, Sep. 8, 1977, abandoned.

[51] Int. Cl.³ .............................................. G05D 23/08
[52] U.S. Cl. .................................. 236/1 G; 236/93 R; 236/101 B
[58] Field of Search ................. 236/1 G, 93 R, 101 B, 236/101 E; 126/285 R; 73/363.1, 363.5; 431/20

[56] References Cited

U.S. PATENT DOCUMENTS

| | | | |
|---|---|---|---|
| 1,669,707 | 5/1928 | Haynes | 73/363.5 |
| 2,062,932 | 12/1936 | Root, Jr. | 236/93 R X |
| 3,089,647 | 5/1963 | Kofink et al. | 236/93 R X |
| 3,228,605 | 1/1966 | Diermayer et al. | 236/93 R |
| 3,510,059 | 5/1970 | Diermayer et al. | 236/101 E X |

Primary Examiner—William E. Tapolcai, Jr.
Attorney, Agent, or Firm—Flehr, Hohbach, Test, Albritton & Herbert

[57] ABSTRACT

A draft control arrangement for use with a gas-fired heating apparatus. The flow of waste gas through a draft hood of the apparatus is throttled by bimetal element means which responds to temperature change for reducing or enlarging the throttle area. Control means is provided for causing the rate of throttle area change during a certain phase of operation to vary from the rate of throttle area change during other phases of operation.

4 Claims, 12 Drawing Figures

DRAFT CONTROL ARRANGEMENT

This is a continuation, of application Ser. No. 831,547 filed Sept. 8, 1977, now abandoned.

BACKGROUND OF THE INVENTION

This invention relates in general to gas-fired heating apparatus and in particular relates to draft control arrangements for such apparatus.

A number of methods and devices have heretofore been suggested for improving the efficiency of gas-fired residential and commercial heating equipment. Certain of these devices are associated with the production and removal of flue gases and include automatic vent dampers, derating of heating equipment by throttling the gas input, fixed vent restrictors, and multi-stage or modulating burner controls.

Automatic vent dampers close the vent during standby periods. Such dampers reduce loss of heated room air through the vent and slow the cooling of the equipment, thereby saving heat for the next cycle which, in typical residential installations, begins five to ten minutes after the furnace is shut down by the room thermostat.

Derating can increase efficiency under certain circumstances but, by itself, unbalances the equipment vent system because the vent is too large for the reduced throughput of the derated equipment. This results in too much room air being aspirated through the relief opening of the draft hood, causing energy waste.

A fixed vent restrictor may be installed in the vent of a derated appliance. The vent restrictor reduces to a limited degree the excess flow in the vent. Since it is fixed and does not sense or compensate for changing draft or vent load situations it may cause spillage of flue gases at the relief opening of the draft hood under marginal draft conditions. During cold, windy weather its resistance to flow is insufficient to prevent excessive aspiration of heated room air.

Multi-stage or modulating control of heating equipment offers the advantage of adjusting the heat output of the heating equipment to actual demand at a particular time, thereby eliminating the wasteful on-off cycles. Also a considerable comfort improvement results from the continuous, even heat output. A heating appliance having multi-stage or modulating controls may be on full flame for ten to twenty minutes in the morning when the thermostat is turned up until comfort temperature is approached. The controls will then reduce the flame so that the predetermined comfort temperature is maintained.

At low flame the equipment-vent system is unbalanced similar to that described under "derating." The vent is too large for the heat throughput at low flame and causes excessive air flow with resultant heat loss. While a fixed vent restrictor can be adjusted to the requirements of a derated furnace in such a manner that the equipment-vent system works reasonably well under some conditions, this adjustment cannot be made for a furnace having multi-stage or modulating controls whose heat throughput may vary from full flame to low flame during the operating cycle.

Heaters having natural draft burners are equipped with draft hoods which prevent disturbance of the combustion process at the burner caused by excessive draft or backdraft in the vent. For economic reasons draft hoods in most domestic and commercial heating equipment are marginally designed, i.e., they tend to spill products of combustion during startup and under unfavorable weather conditions. The general trend to increase the efficiency of heating equipment means that in the future temperatures of the vent gases on the average will be lower than in the past. This means less buoyancy and therefore higher tendency for spillage at the draft hood. This tendency is accentuated by energy conservation devices in the vent, such as vent dampers and/or vent restrictors. Therefore the draft hood becomes a critical component of the equipment-vent system if the efficiency of the natural draft heating apparatus is increased and it is desirable to combine energy conservation devices and methods, such as vent dampers, vent restrictors and derating with more suitable draft hoods.

Another factor affecting the equipment-vent system efficiency is the sizing of vent connectors which are standardized in full inch increments. A four-inch vent connector has a 12.6 square inch cross section. A five-inch vent connector has a 19.6 square inch cross section, an approximately 55% increment. Since heating equipment is available in a wide variety of input ratings the vent connector available for a particular unit may be too small while the next size vent connector is oversized. This fact also calls for compensating means to make the equipment-vent system energy efficient.

It is desirable to combine heating equipment with a device that continuously adjusts the vent opening in proportion to the heat throughput of the equipment and to the draft situation. From an energy conservation standpoint the best device is one that reduces dilution air escaping through the draft hood to a practical minimum, regardless of heat output of the equipment or the weather condition at any given moment. A thermally controlled vent damper such as described in U.S. Pat. Nos. 3,228,605 and 3,510,059 can accomplish this task reasonably well. The wide variety of equipment designs, of equipment-vent combinations and of equipment and weather related variables and the accentuation of shortcomings of natural draft vent systems by the efforts to increase heating equipment efficiency make desirable vent control devices that retain the simplicity and reliability of the described thermally controlled vent dampers but which would be more adaptable to various designs of equipment and more efficient and precise in controlling heat loss through escape of room air.

OBJECTS AND SUMMARY OF THE INVENTION

It is the general object of the invention to provide a new and improved draft control arrangement for a gas-fired heating apparatus.

Another object is to provide a draft control arrangement of the type described which reduces dilution air to a practical minimum under substantially all operating conditions, and in spite of such reduction in dilution air controls spillage at the draft hood relief opening within generally accepted standards.

Another object is to provide a draft control arrangement of the type described in which the components can be easily matched by means of a few modular subassemblies for a range of different heater design and heater-vent system characteristics.

The invention in summary includes a throttling device method in which flow throttling means includes bimetal elements which are shaped to project across the throttle area within the conduit of a draft hood. The bimetal elements change shape responsive to temperature change, and control means is provided for causing the rate of throttle area change for unit temperature change during one phase to vary from the rate of throttle area change for unit temperature change during another phase.

DESCRIPTION OF THE PREFERRED EMBODIMENTS

Figure 1:
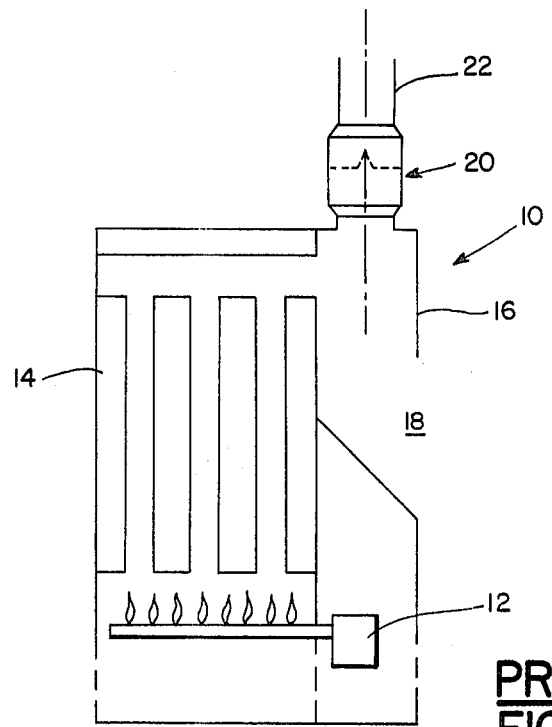
FIG. 1 is a schematic view of a prior art gas-fired natural draft heating apparatus.
Figure 2:
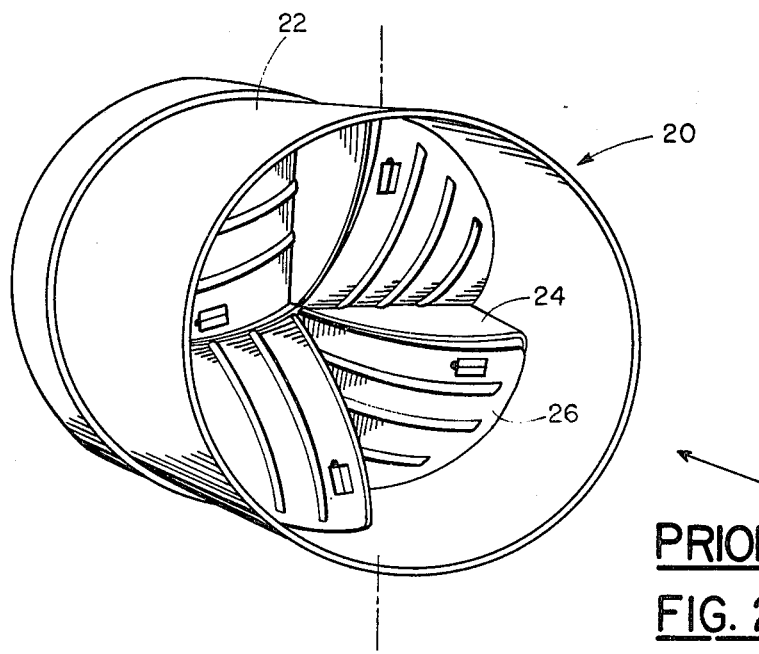
FIG. 2 is a perspective view of a prior art vent damper of the type which can be employed in the heating apparatus of FIG. 1.

FIGS. 1 and 2 illustrate a conventional prior art heating apparatus shown as a domestic furnace 10 incorporating a burner 12, heat exchanger 14, draft hood 16, draft hood relief opening 18, thermally controlled vent damper 20 and vent connector 22.

Prior art vent damper 20 includes a tubular housing 22 which is subdivided by partitions 24 into four quadrants. Each quadrant is covered by a thin, slotted bimetal flap 26. The flaps are attached at their upper edges to the partitions and curve inwardly into abutting relationship with the partitions when the damper is closed. The temperature of hot flue gases causes the flaps to change shape and curl inwardly to open the throttle area. The initial movement opens a disproportionately large passage for the escape of flue gases because an opening is created not only around the inside of the damper housing but also between the edges of each flap and the adjacent partition. This is generally desirable, but for certain equipment-vent systems the initial ratio between angular movement of the flaps and throttle area is too large, and for other systems the ratio is too small.

Figure 3:
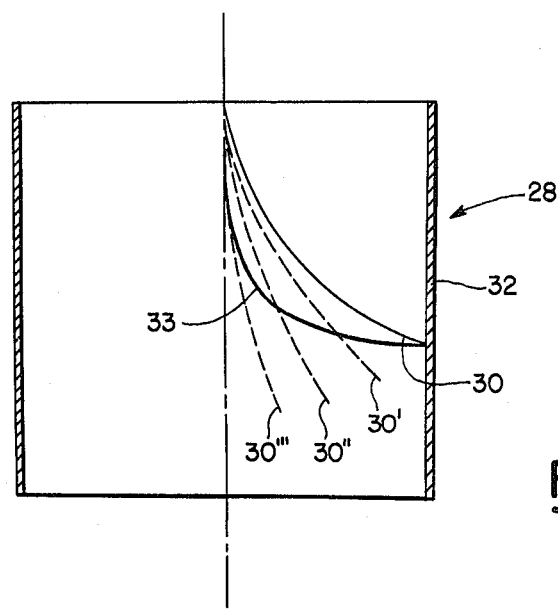
FIG. 3 is a longitudinal section view of a draft control arrangement incorporating one embodiment of the invention.

FIG. 3 illustrates an embodiment of the invention providing a draft control arrangement 28 suitable for use in heating apparatus of the type described for FIG. 1. This embodiment provides for control of the draft in a manner that during the initial phase of opening movement the rate of throttle area change per unit change in temperature is less than the rate of throttle are change per unit change in temperature during the remaining phase of movement. Control arrangement 28 includes four thin, slotted bimetal flaps 30, one of which is illustrated, mounted within a circular conduit 32 in the manner described in connection with FIG. 2. Four radially extending partitions 33 are mounted between the flaps in the manner previously described. Whereas in the control arrangement of FIG. 2 the partition edges are shaped commensurate with the curve of the flaps when in their closed positions, in the present embodiment the edges of the partitions 33 are formed with an outer margin which projects beyond the curved path of the closed flap 30. Therefore as the flaps open a portion of the throttle area which would otherwise open at the flap edges remains closed by the crescent-shaped margin of the partitions. This is illustrated by the incremental positions of the flaps shown in FIG. 3. Thus, when the flap opens to the successive positions 30', 30" and 30''' the rate of throttle area opening to flap displacement, i.e., temperature change, is less than the same rate for the comparable flap position in the prior art arrangement of FIG. 2. The shape of the partition edges for draft control arrangement 28 may be varied with other curvatures to achieve the desired draft control.

Figure 4:
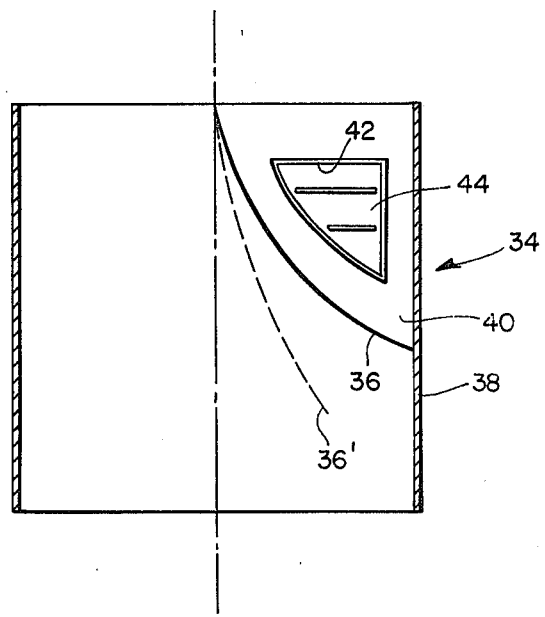
FIG. 4 is a longitudinal section view of a draft control arrangement incorporating another embodiment.
Figure 5:
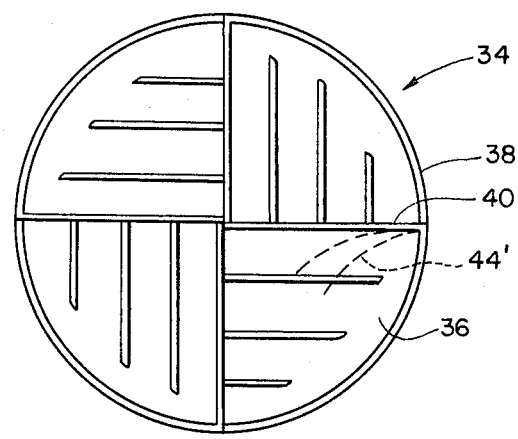
FIG. 5 is a top plan view of the arrangement of FIG. 4.

FIGS. 4 and 5 illustrate another embodiment providing a draft control arrangement 34 which is adapted to achieve a higher rate of throttle area change during initial flap opening phase relative to the rate of throttle area change during the remaining phase of flap movement. Control arrangement 34 includes four thin, slotted bimetal flaps 36, one of which is illustrated, mounted within circular conduit 38 which in turn is subdivided into quadrants by four radially extending partitions 40. Each partition is formed with a generally triangular-shaped opening 42. A slotted bimetal secondary flap 44 is secured at one edge to the opening with the flap lying flat and closing the opening when cold. When hot vent gases reach the damper the main flaps open as at 36' in the manner previously described. At the same time the secondary flaps 44 change shape and curve away from the openings due to increase in temperature thereby providing an additional gas flow path below the flap 36 and through opening 42 to above the adjacent flap. This increases the effective throttle area opening during the initial stage. When the main flaps 36 open further the relative size of the secondary openings 42 diminishes, and in the fully open flap position the openings 42 are substantially covered by the main flaps.

Figure 6:
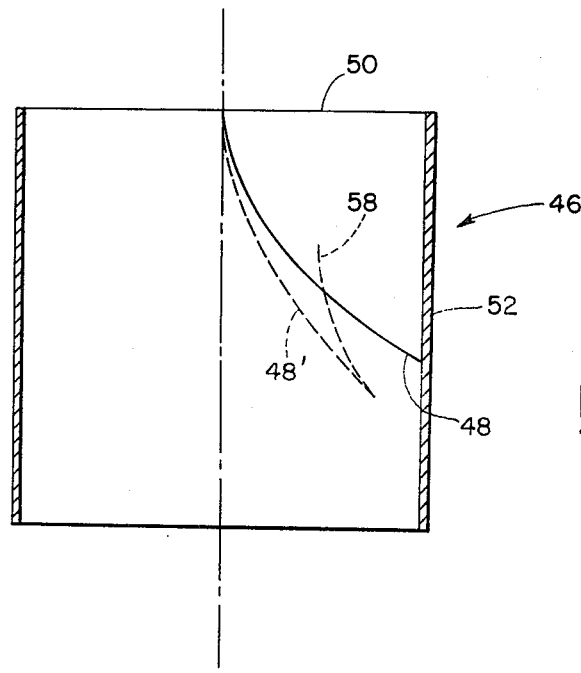
FIG. 6 is a longitudinal section view of a draft control arrangement incorporating another embodiment.
Figure 7:
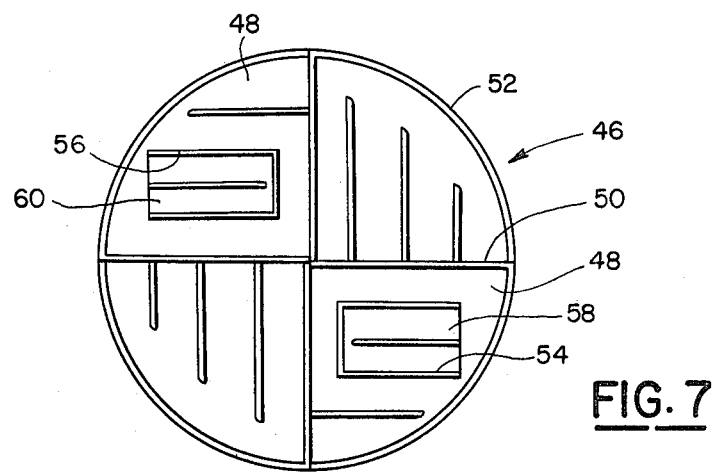
FIG. 7 is a bottom plan view of the control arrangement of FIG. 6.

FIGS. 6 and 7 illustrate another embodiment which provides another method for achieving a higher rate of throttle area change per unit temperature change during initial opening phase in comparison to the rate of throttle area change per unit temperature change during the remaining phase. This embodiment provides draft control arrangement 46 having four thin, slotted bimetal flaps 48 together with four radially extending partitions 50 mounted within circular conduit 52 in the manner previously described. As shown in FIG. 7 a pair of rectangular openings 54, 56 are formed in the two flaps 48 [which are disposed in diametrically opposed quadrants]. A pair of thin, slotted secondary flaps 58, 60 are mounted at a side of the respective openings and lie flat across and close the openings when at a cold temperature. The presence of hot flue gases causes both the main and secondary bimetal flaps to open so that there is a relatively large change in throttle area during the initial phase of opening.

Figure 8:
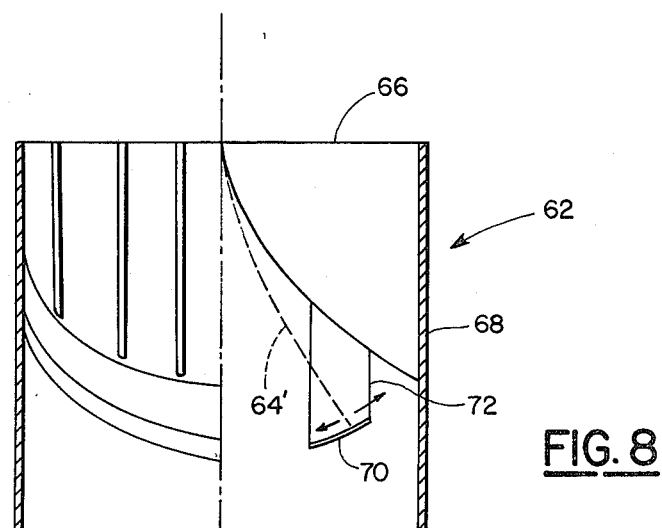
FIG. 8 is a longitudinal section view of a draft control arrangement incorporating another embodiment.
Figure 9:
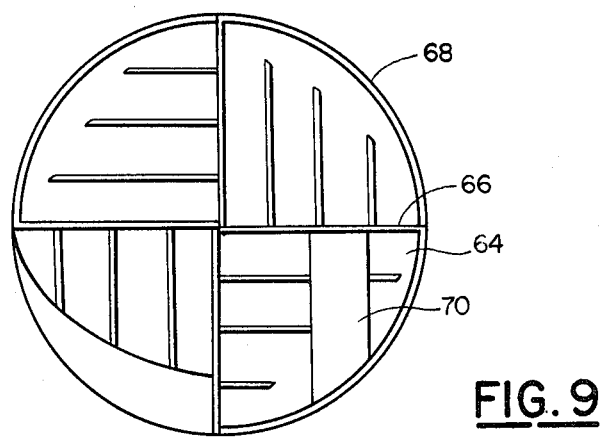
FIG. 9 is a bottom plan view of the control arrangement of FIG. 8.

FIGS. 8 and 9 illustrate an embodiment providing draft control arrangement 62 in which the effective throttle area remains substantially constant during movement of the flaps through an intermediate range of positions. The arrangement 62 includes four thin, slotted bimetal flaps 64 mounted in the quadrants defined by radially extending partition 66 which in turn are mounted within cylindrical housing 68. Cylindrical or near-cylindrical cover surfaces 70 are mounted by brackets 72 in each quadrant so that the lower edges of the flaps move in closely-spaced relationship above the surfaces 70 during an intermediate range of flap travel as shown at 64'. During initial flap movement up to the cover surfaces the throttle area opens progressively. During movement of the flap over the cover surfaces the throttle area remains constant, and thereafter further enlarges as the flap moves beyond the surfaces. The cover surfaces may be oriented so that the spacing from the flaps either increases or decreases, as desired, during movement of the flap over the surfaces. The cover surfaces could also be arranged to cooperate with the flaps to keep the throttle area constant or nearly constant during movement of the flaps from an intermediate to a fully open position. This may be desirable when the heating equipment is connected to oversized vents or chimneys.

The embodiments described above may be applied to one or more bimetal flaps of a draft control arrangement, or the embodiments may be used in combination, or may be used in draft control arrangements having any number of flap elements.

Figure 10:
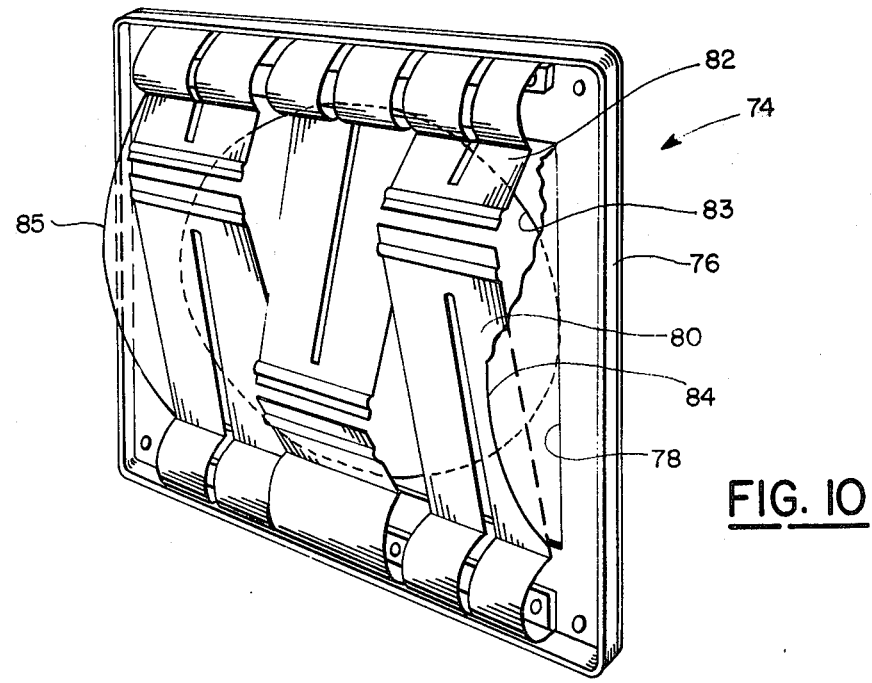
FIG. 10 is a perspective view of a draft control arrangement incorporating another embodiment.

FIG. 10 illustrates an embodiment providing a draft control arrangement 74 in which the foregoing draft control concepts of the invention are applied in a rectangular frame 76 having a rectangular opening 78. A plurality of flat, slotted bimetal reeds 80, 82 are mounted at opposite ends of the frame and project across the opening. When cool the reeds lie flat and close the opening; when heated they move apart as shown in the partially open positions in FIG. 10. An asbestos mask 83 having a circular opening is mounted within the frame for connection to a circular vent pipe.

Draft control elements comprising a pair of semicircular partitions 84, 85 are mounted on opposite edges of the frame and extend at right angles to the reeds. The partitions serve to limit the area of throttle opening during initial reed displacement as compared to the area which would be opened without the partitions. The partitions thereby perform a similar function to the embodiment described for FIG. 3. Should a higher rate of throttle area opening during initial movement be desired then the reeds could be formed with openings covered by flat secondary bimetal reeds, not shown. The secondary reeds would open during an initial phase and function in the manner described above for the embodiment of FIG. 4.

Figure 11:
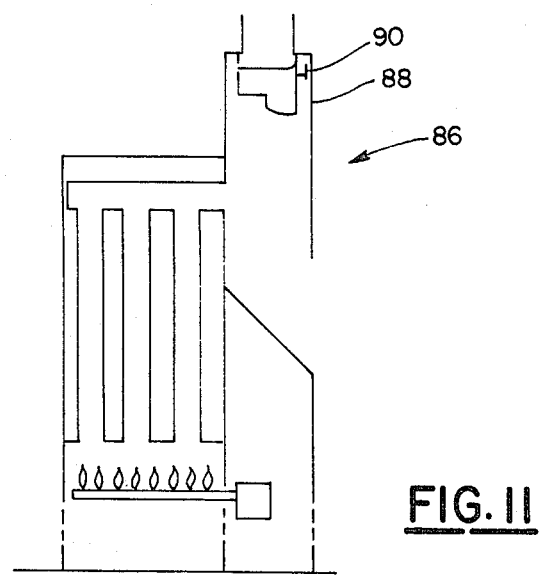
FIG. 11 is a schematic view of heating apparatus incorporating another embodiment of the draft control arrangement.
Figure 12:
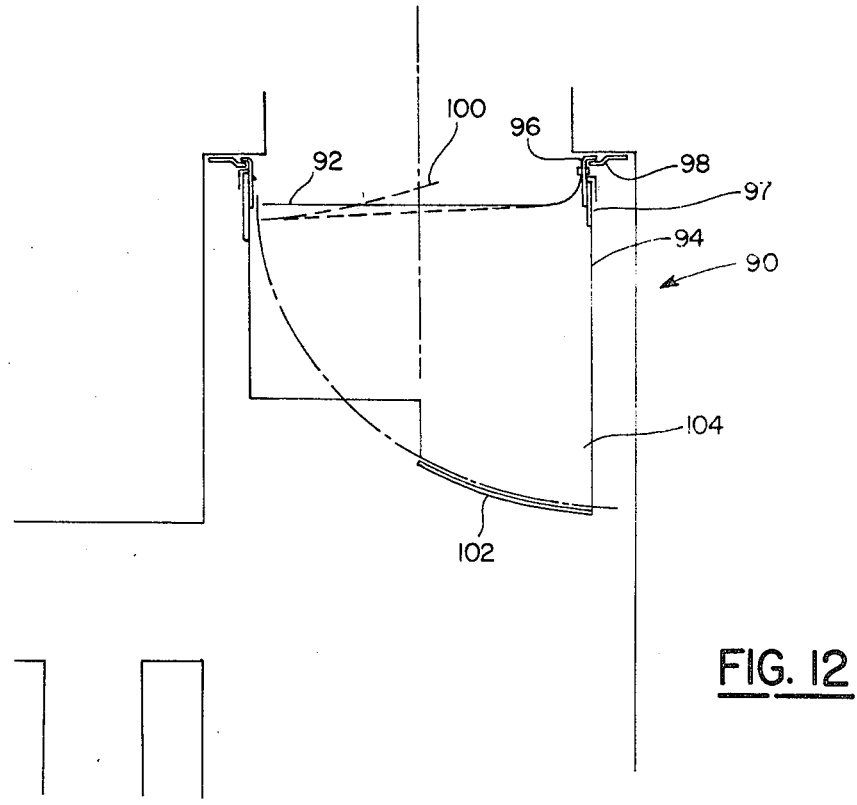
FIG. 12 is an enlarged longitudinal section view of the draft control arrangement and portion of the draft hood of the embodiment of FIG. 11.

FIGS. 11 and 12 illustrate an embodiment providing heating apparatus 86 which achieves the previously described feature of maintaining precise control of the draft rate as well as minimizing spillage of the flue gases at the draft hood relief opening within acceptable standard in spite of increased equipment efficiency (which results in lower vent temperatures, less buoyancy and therefore a tendency for more spillage) and in spite of additional resistance in a vent system caused by vent restrictors and/or vent dampers. In conventional heating equipment such as the domestic furnace of FIG. 1 the draft hood relief opening is not much lower than the exit of the heat exchanger and the volume of the draft hood is relatively small causing a tendency for spillage during startup and during unfavorable draft conditions.

Heating apparatus 86 includes a vertically elongate draft hood 88, in the upper end of which is mounted draft control arrangement 90. Under unfavorable draft conditions the elongated draft hood allows more time for buoyancy and thereby more time for flow of vent gases to be established before spillage occurs during startup and during sudden changes of the draft condition in a system.

Draft control arrangement 90 is illustrated in detail in FIG. 12 and is constructed of a relatively few number of component parts which can be assembled to provide the best combination for many different equipment systems. The arrangement can incorporate any of the partition arrangements and secondary bimetal flaps and control surfaces described for the foregoing embodiments. In FIG. 12 there is specifically illustrated an arrangement which provides a very quick reaction or rapid increase in throttle area at lower temperatures, normal increase of throttle area during intermediate temperature range, and little or no additional opening when high temperatures are present at the draft hood outlet. This is accomplished by mounting a main bimetal flap 92 in a frame 96. The frame 96 is detachably mounted in brackets 98 at the upper end of the draft hood. A sleeve 94 is equipped with tongues or snap fasteners 97 which detachably mount within frame 96. This provides two modular units, the draft control and the sleeve. A secondary bimetal flap 100 is mounted across an opening formed in the main flap. A spherical or near spherical-shaped control surface 102 is mounted by arms 104 to the sleeve and is positioned beneath the path of the main flap during the terminal portion of its movement.

In operation the secondary flap 100 opens with the main flap during the initial phase to provide the high rate of throttle area opening per unit temperature change. During the intermediate range of movement of the main flap the rate of change of throttle opening is substantially normal because the effect of the secondary flap diminishes. When the tip of the main flap travels over the surface 102 at high gas temperatures the throttle area remains constant.

While cover surface 102 is illustrated as fixed, it could be adjustably mounted to the sleeve 94 so that its shape or position could be selectively changed as required to effect a desired change in controlling the draft.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. In a gas-fired heating apparatus having a draft hood for directing a flow of waste gas to a vent, a throttling device comprising the combination of main flow control means for sensing temperature of the gas within the hood and responding to said temperature for reducing or enlarging the cross-sectional throttle area for directing gas to the vent, said main flow control means including bimetal element means shaped to project across said throttle area and changing shape at a first rate responsive to temperature change for reducing or enlarging the throttle area, and secondary bimetal element means which changes shape, at a rate which differs from the first rate, responsive to gas temperature for causing the rate of throttle area change for unit change in temperature during one phase of operation to vary from the rate of throttle area change for unit change in temperature during another phase.

2. A method of controlling the flow of gas through the draft hood of a gas-fired heating apparatus in which the draft hood includes first and second control elements movable for varying the throttle area of gas flow, including the steps of causing responsive to gas temperature the first control element to change shape at a first rate and open a first portion of a path for changing the throttle area at a given rate relative to change in gas temperature during an initial flow opening phase, and causing responsive to gas temperature the second control element to change shape at a rate which differs from the first rate and open another portion of the path for changing the throttle area at another rate relative to change in gas temperature during a second flow opening phase.

3. A method as in claim 2 in which the rate of change of the throttle area during the initial phase is greater than the rate of change of the throttle area during the second flow opening phase.

4. In a gas-fired heating apparatus having a draft hood for directing a flow of waste gas to a vent, a throttling device comprising the combination of main flow control means for sensing temperature of the gas within the hood and responding to said temperature for reducing or enlarging the cross-sectional throttle area for directing gas to the vent, said main flow control means including bimetal element means shaped to project across said throttle area and changing shape responsive to temperature change for reducing or enlarging the throttle area, and secondary control means for causing the rate of throttle area change for unit change in temperature during one phase of operation to vary from the rate of throttle area change for unit change in temperature during another phase, said secondary control means including means forming an opening in the first-mentioned bimetal element means, together with secondary bimetal element means carried by the first element and extending across the opening for reducing or enlarging the flow area therethrough responsive to gas temperature for causing a high rate of throttle area change for unit change in gas temperature during said one phase.

* * * * *